March 27, 1962  L. M. SCHWARTZ  3,026,917
PORTABLE POWER SAW
Filed April 20, 1960
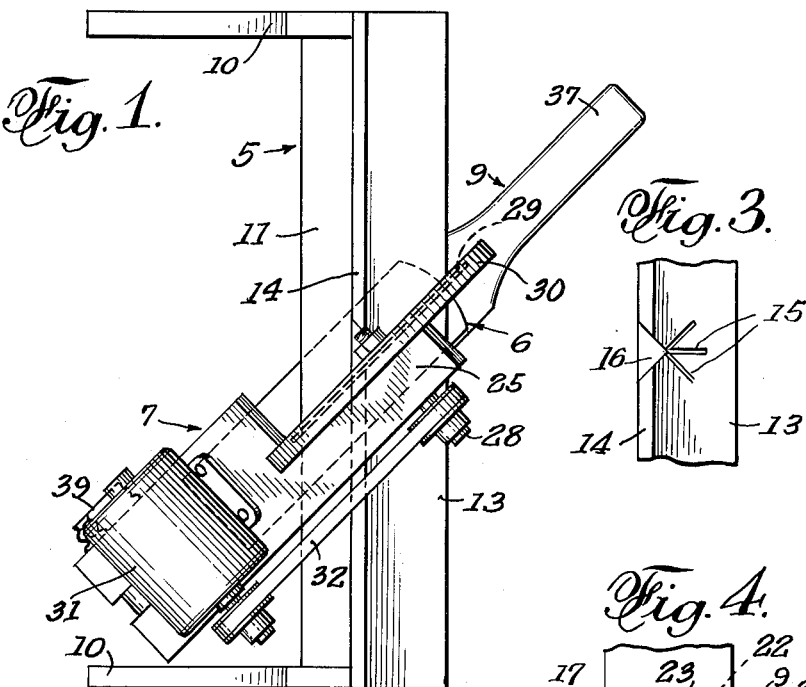
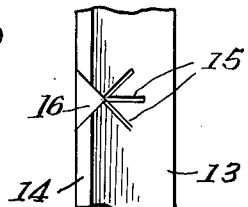
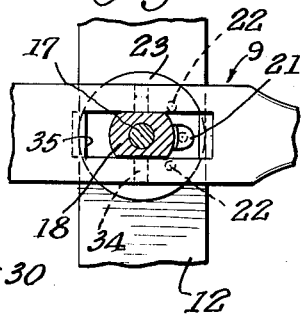
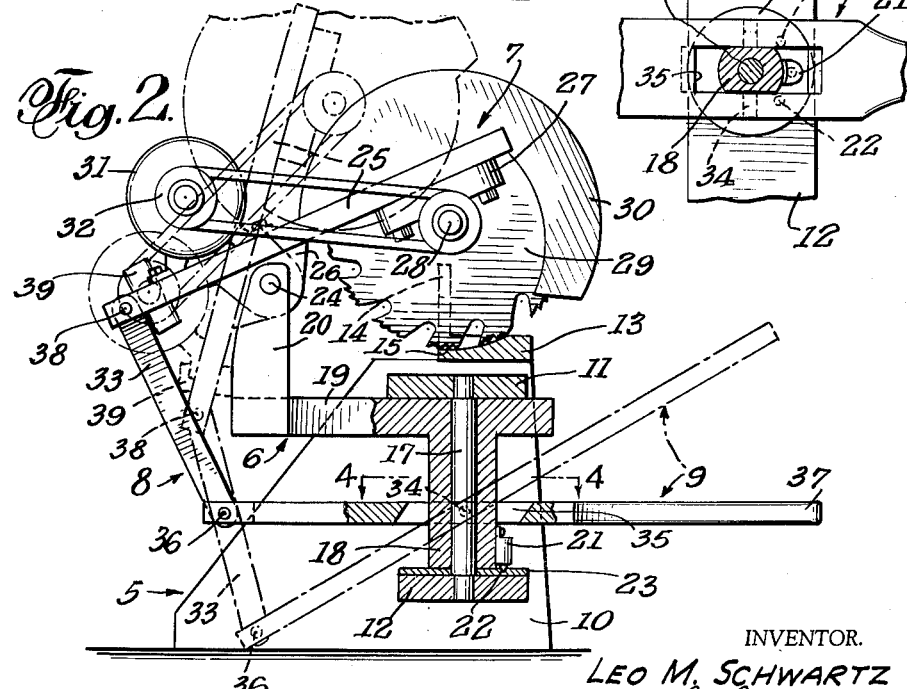
INVENTOR.
LEO M. SCHWARTZ
BY C. G. Stratton
ATTORNEY

United States Patent Office 3,026,917
Patented Mar. 27, 1962

3,026,917
PORTABLE POWER SAW
Leo M. Schwartz, 12780 Norris Ave.,
San Fernando, Calif.
Filed Apr. 20, 1960, Ser. No. 23,419
5 Claims. (Cl. 143—6)

This invention relates to a power saw particularly for cutting elongated members, such as molding, although the same may have other applications.

An object of the present invention is to provide a portable power saw that is both adjusted to the angle of cut desired and operated by a single controller that may be manipulated with one hand. Thus, the invention is characterized by ease of operation together with rapidity and accuracy, the present saw being efficient, timesaving and inexpensive to operate.

Another object of the invention is to provide a power saw of the character above indicated that, because the same may be adjusted to the angle of cut and moved through its cutting operation with one hand, the other is left free to hold the member being cut in non-displaceable position during such adjustment and cutting.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a plan view of a portable power saw according to the present invention, the same being shown in one of several different positions of adjustment.

FIG. 2 is a cross-sectional view thereof in another position of adjustment, the saw being shown in full-lines in cutting position, and in dot-dash lines in non-cutting position.

FIG. 3 is a fragmentary plan view of a work support used in the present machine.

FIG. 4 is a fragmentary plan sectional view as taken on the line 4—4 of FIG. 2.

The machine that is illustrated comprises, generally, a base 5, a swivel mount 6, a power-driven saw unit 7 pivotally carried by the mount 6, means 8 to move the unit 7 on its pivot and including an operating handle 9 that also controls the swivel adjustment of the mount 6.

The base is shown in an exemplary manner, as comprising end support brackets 10, upper and lower longitudinal members 11 and 12, respectively, that span between the brackets 10, and a work support comprised of a base 13 and a back wall member 14, also spanning between the brackets 10. At the middle of the base 13, the same is provided with saw-accommodating kerfs 15 at such angles as conform to the desired angular positions of adjustment of the saw, the wall member being cut away accordingly at 16 to allow the different saw positions. As shown in FIG. 2, the base members 11 and 12 are connected by a preferably vertical shaft 17 which has a middle position between the brackets 10.

The swivel mount 6 has a sleeve 18 through which the shaft 17 extends, an arm 19 extending normal to the sleeve from the upper end thereof, and bracket ears 20 that extend upwardly from the outer end of arm 19. The sleeve 18 is confined between the base members 11 and 12 so that the mount is capable only of swivel movement on the shaft 17.

The swivel position of adjustment of the mount is releasably retained as by a resilient detent member 21 that is carried by the sleeve 18, and by dents or depressions 22 in a metal plate 23 that is affixed to the upper surface of the base member 12. It will be understood that the depressions 22 may be arranged as desired to provide for such angles of adjustment as may be required. In this case, as shown in FIG. 4, three depressions 22 are shown, one for a normal position, as when cutting transversely through a workpiece, and the other two at 45°, in each direction, for miter-cutting positions.

The saw unit 7 is carried by a pivot 24 spanning between the upper ends of the bracket ears 20 of the swivel mount 6. Said unit is shown as a support base 25 that, by means of an ear 26, is connected to the pivot 24 so that the same has a rocking motion in a vertical plane, i.e., transverse to the horizontal plane of adjustment of the mount 6.

At one end, the base 25, in a bearing 27, carries a stub shaft 28 to which is affixed a saw blade 29, a guard 30, being provided to enclose the saw teeth except where the same pass through a workpiece and enter one or the other of the kerfs 15. At the other end, the base 25 mounts an electric motor 31 in a position where the same normally serves to overbalance the base 25 to raise the saw cutter clear of a workpiece in position to be cut. A drive 32 connects the motor and the shaft 28 to, thereby, drive the blade 29 when the motor is energized. Normally, because of the overbalancing weight of the motor, the saw unit 7 has the raised position shown in dot-dash lines in FIG. 2. This position is maintained, regardless of the angular adjustment of the mount 6 until the means 8 is used to depress the cutter to cut through a workpiece.

Said means 8, in this instance, comprises the mentioned handle 9, and a connecting link 33. The handle is mounted on a pivot 34 extending transversely from the sleeve 18, the sleeve extending through an opening 35 in the handle for the purpose of mechanical alignment. One end of link 33 is connected by means of a pivot 36 to the rearward end of the handle, the forward end 37 being extended and shaped for facile gripping and manipulation. The other end of the link is connected by means of a pivot 38 to the rearward end of the base 25 of the unit 7.

Electric current may be brought to the motor 31 in the usual way and controlled by a switch. In this case, the switch comprises a mercury switch 39 that is mounted on the unit 7 to tilt between a current-interrupting position (the dot-dash lines of FIG. 2) and a motor energizing position, as shown in full lines. Thus, the saw does not rotate except when being brought to cutting position by depression of handle 9. Then, upon release of said handle, the saw ceases rotation because switch 39 assumes its "off" position.

The mode of operation is extremely simple. The operator places a piece of work on the work support and holds the same with one hand. Then, with the other hand, he grasps the end 37 of the handle 9 to, first, swivel the mount 6 to the desired angular position of the cutter blade and, then, by depressing the handle, performs the cut through the workpiece. Upon release of the handle, the saw blade moves up, the power to the motor goes off, and the machine is ready for the next cutting operation.

The motor and saw blade may be directly connected at the forward end of the support 25 and a separate weight may be provided to overbalance the support.

While I have illustrated and described what I now contemplate to be the best mode of carrying out my invention, the construction is, of course, subject to modification without departing from the spirit and scope of my invention. Therefore, I do not wish to restrict myself to the particular form of construction illustrated and described, but desire to avail myself of all modifications that may fall within the scope of the appended claims.

Having thus described my invention, what I claim and desire to secure by Letters Patent is:

1. In a power saw having a counterbalanced arm pivoted above a work support and carrying a circular saw and an electric motor driving the saw, spaced vertical supports adapted to be placed upon a work bench and the like, spaced transverse upper and lower parallel members secured between said vertical supports, a vertical shaft journalled in said parallel members, a sleeve mounted on said shaft and restrained against vertical movement by said members, a bracket mounted on said sleeve and extending behind and above the upper transverse member, the counterbalanced arm being pivoted on said bracket, an operating lever pivotally mounted intermediate its length on said sleeve, the forward end of said lever providing a handle, a rigid link pivotally connecting the rearward end of the operating lever and the counterbalanced arm, movement of said handle downwardly being effective to lower the circular saw and movement in lateral direction being effective to adjust the angle at which the saw cuts the work from front to back but normal to the top and bottom faces of the work, and a work support of L cross section extending across the top of said vertical supports at the front of the device.

2. A portable power saw as set forth in claim 1 comprising a normally-open switch controlling current to the motor, said switch closing to energize said motor during downward movement of the saw blade to cutting position.

3. A power saw as set forth in claim 1 and in which said work support is arranged with a horizontal portion facing toward the front of the device and the vertical wall of the L-shaped work support extending vertically upward from the rearward edge of the horizontal portion, material being removed at the center portion of said work support from both the vertical and horizontal portions while leaving a part of the horizontal portion uncut to permit the saw to cut completely through the work both normal to the center line of the work or selectively at an angle thereto.

4. A portable power saw according to claim 2 in which selective detent means is provided to releasably hold the saw blade in the adjusted angular position thereof, said detent means comprising a resilient detent mounted on the sleeve and selectively engageable with recesses located on the lower transverse member.

5. A power saw as set forth in claim 3 and in which the sleeve is provided with diametrically opposite flat surfaces and the operating lever is formed with a cut-out in which said flat surfaced portion of the sleeve is located.

References Cited in the file of this patent

UNITED STATES PATENTS

| 1,481,569 | Tannewitz | Jan. 22, 1924 |
| 1,646,589 | Meek et al. | Oct. 25, 1927 |
| 1,697,893 | Lambert | Jan. 8, 1929 |
| 2,171,024 | Coates | Aug. 29, 1939 |
| 2,332,654 | Mead et al. | Oct. 26, 1943 |
| 2,372,699 | Wiken et al. | Apr. 3, 1945 |

FOREIGN PATENTS

| 591,212 | Great Britain | Aug. 11, 1947 |